Figure 6:
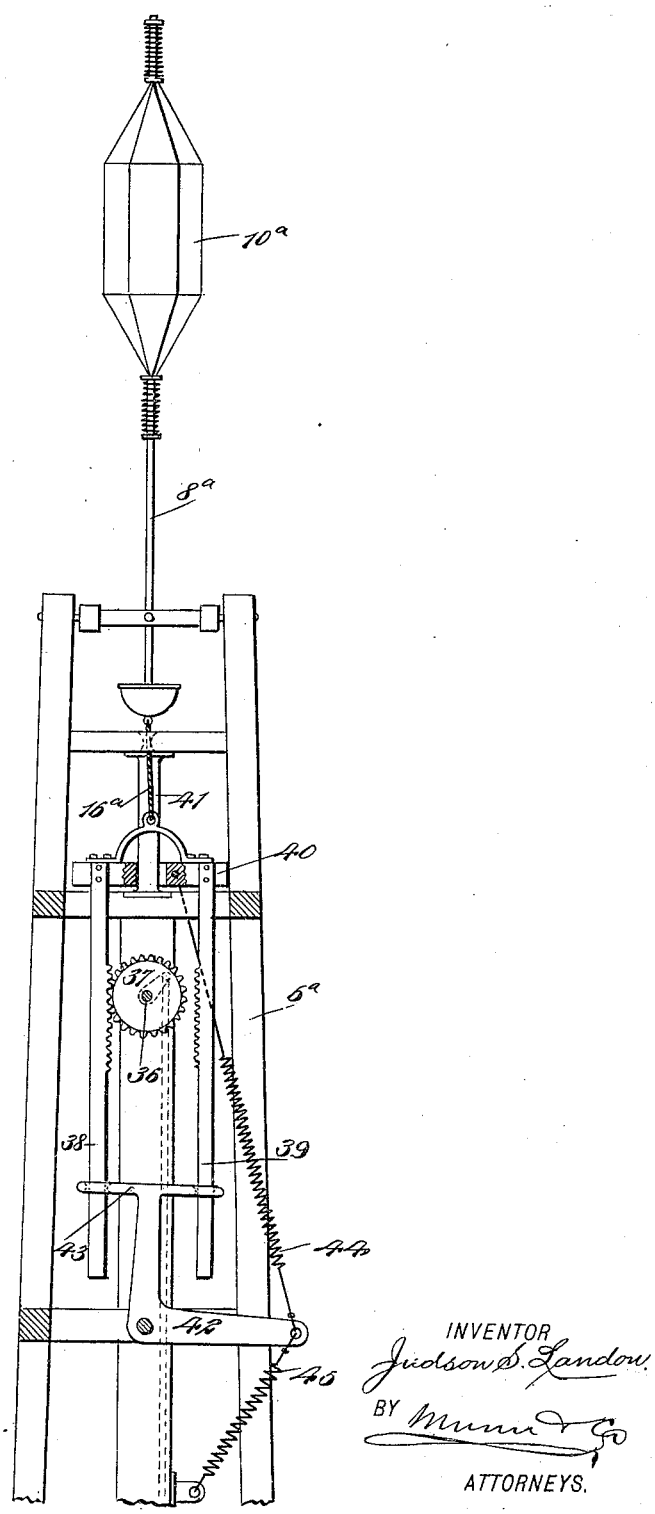

No. 640,003. Patented Dec. 26, 1899.
J. S. LANDON.
WIND MOTOR.
(Application filed Feb. 1, 1899.)
(No Model.) 2 Sheets—Sheet 1.
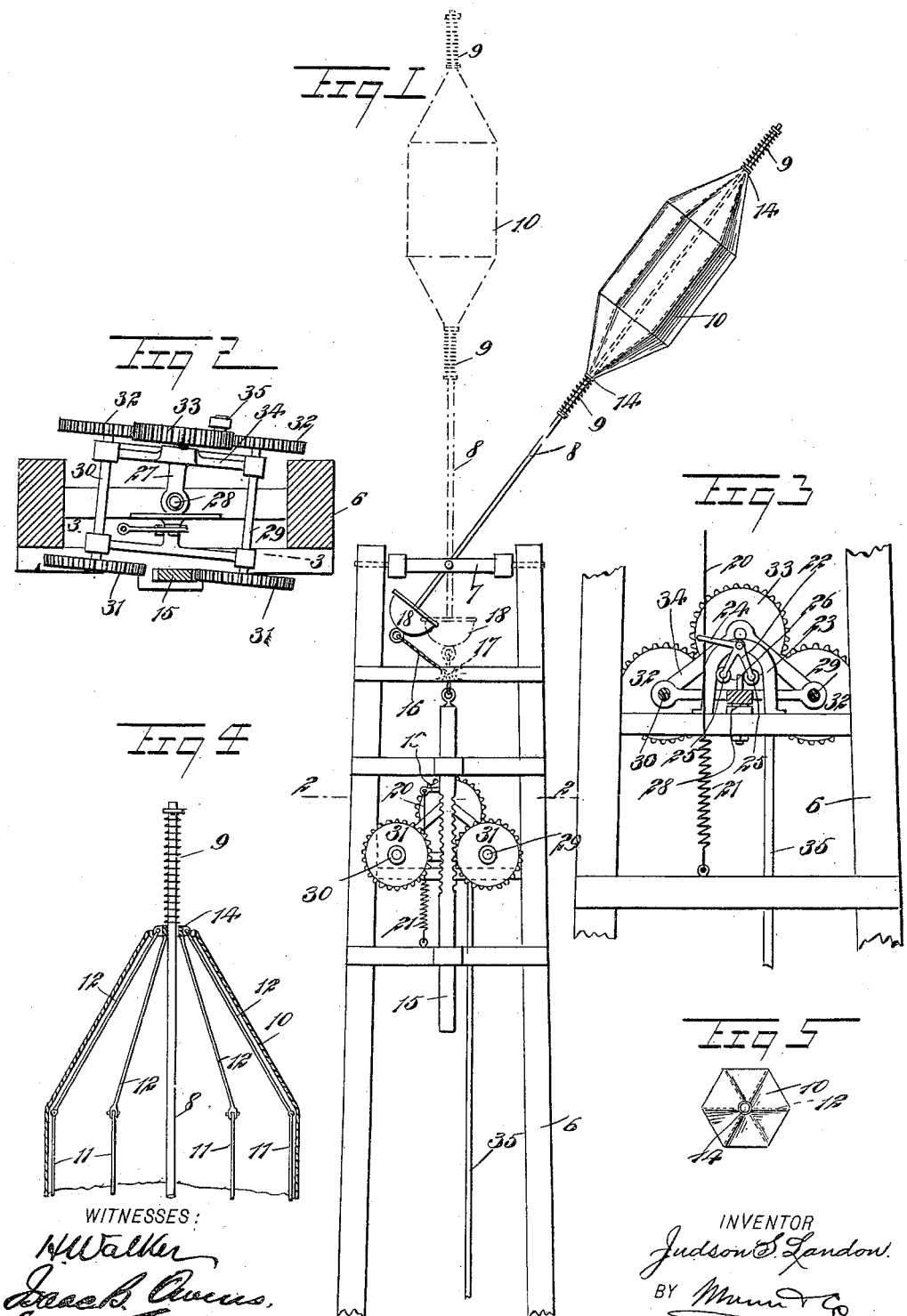
WITNESSES:
INVENTOR
Judson S. Landon.
BY
ATTORNEYS.

No. 640,003. Patented Dec. 26, 1899.
J. S. LANDON.
WIND MOTOR.
(Application filed Feb. 1, 1899.)
(No Model.) 2 Sheets—Sheet 2.

WITNESSES:
H. Walker
Isaac B. Owens

INVENTOR
Judson S. Landon.
BY Munn & Co
ATTORNEYS.

UNITED STATES PATENT OFFICE.

JUDSON STUART LANDON, OF SCHENECTADY, NEW YORK.

WIND-MOTOR.

SPECIFICATION forming part of Letters Patent No. 640,003, dated December 26, 1899.

Application filed February 1, 1899. Serial No. 704,152. (No model.)

*To all whom it may concern:*

Be it known that I, JUDSON STUART LANDON, of Schenectady, in the county of Schenectady and State of New York, have invented a new and Improved Wind-Motor, of which the following is a full, clear, and exact description.

The purpose of this invention is to provide a wind-motor which shall be very sensitive to light currents of air and which will uniformly and regularly transmit the power direct to a pump or other apparatus placed at the base of the tower.

To this end the invention embodies a pole mounted to move in a variety of directions and carrying an object offering resistance to the wind, so that as the pole is swung from point to point with the varying flaws of wind the movement of the pole may be transmitted through certain gearing to the apparatus to be driven.

This specification is the disclosure of several forms of my invention, while the claims define the actual scope thereof.

Reference is to be had to the accompanying drawings, forming a part of this specification, in which similar characters of reference indicate corresponding parts in all the views.

Figure 1 is a side elevation of the invention. Fig. 2 is an enlarged plan view, with parts in section, on the line 2 2 of Fig. 1. Fig. 3 is an enlarged side elevation, with parts in section, on the line 3 3 of Fig. 2. Fig. 4 is an enlarged detail section of the body that is mounted on the pole to receive the action of the wind. Fig. 5 is a reduced plan view illustrating the form of this body, and Fig. 6 is a sectional elevation of a modification of the invention.

According to the first five figures, the tower 6 of the motor carries at its upper end a bar 7, mounted to turn back and forth and carrying a pole 8, pivoted to the bar at right angles to the pivots on which the bar is mounted. The pole is thus mounted after the manner of a gimbal, so that it may swing in various directions. Surrounding the free portions of the pole are two spiral springs 9, separated from each other and having located between them the wind-engaging body formed of a number of ribs covered by flexible cloth 10. These ribs each consist in a middle section 11, extending parallel with the pole 8, and in two end sections or spreaders 12, which converge at each end of the wind-engaging body and have their outer ends fast to a collar 14. (See Fig. 4.) The collars 14 slide on the pole 8 and are normally pressed together by the springs 9, so that the wind-engaging body is normally expanded to offer the greatest resistance to the wind. Should the wind become high, the pressure of the wind against the wind-engaging body will push the rods 11 in and compress the springs 9, thus reducing the area of the said body, and consequently the force with which the wind acts on the motor.

Mounted in the upper portion of the tower below the bar 7 is a vertically-reciprocal rack-bar 15, provided with a double line of teeth at opposite sides thereof. This bar is connected with the lower end of the pole through the medium of a cord 16, passing through a guide 17, formed in the tower. The lower end of the pole 8 has a counterbalance-weight 18 attached thereto, which serves normally to maintain the pole in the upright position indicated by the dotted lines in Fig. 1. Attached to the bar 15 is a short arm 19, that carries a cord 20, the lower end of which is connected with a retractile spring 21, in turn made fast to a stationary part of the tower. The spring 21, acting through the cord 20 and arm 19, serves to draw downwardly the bar 15. The movement of the cord 20, with the bar 15, is utilized to regulate gearing for transmitting movement from the bar 15, which is effected through the medium of a bell-crank 22, pivotally mounted on a U-shaped support 23, carried on the tower 6. Connected with the bell-crank 22 is an arm 24, which is in turn connected with the cord 20. As the cord 20 moves the arm 24 is swung and its movement transmitted to the bell-crank 22. The extremities of the arms of the bell-crank 22 carry antifriction-rollers 25, which lie one on each side of a pin 26, fast to the frame 27, on which the aforesaid gearing is mounted, whereby to shift the frame, as will be fully described hereinafter.

The frame 27 is mounted to rock on a vertical pivot 28, supported on the tower 6, and this frame 27 carries two revoluble shafts 29 and 30, to one end of each of which is secured a large and slightly-beveled gear-wheel 31, and to the other end of each of which is secured a spur-gear 32. The spur-gears 32 mesh with a gear 33, mounted on a truss 34, forming part of the frame 27, and transmit to said wheel 33 the movements of the shafts 29 and 30. This gear 33 is in connection with a pitman 35 or other device for transmitting the movement of the gear downward to the apparatus in connection with which the motor is used. The beveled gears 31 are located, respectively, on the sides of the rack-bar 15, so that as the frame 27 swings on the pivot 28 the gears 31 are alternately engaged and disengaged with the rack-bar, so that the movement of the rack-bar downward is transmitted to one of the gears 31 and the movement of the rack-bar upward is transmitted to the other of the gears 31. These movements of the gears 31, respectively, drive the shafts 29 and 30, and these shafts transmit their movement to the pitman 35.

As the wind acts on the pole 8 and the rack-bar 15 is thereby set in movement the bell-crank 22 is oscillated and the wheels 25 alternately engage with the pin 26, so that the frame 27 is caused also to oscillate. When the rack-bar 15 moves upward, the cord 20 has a like movement, and consequently the bell-crank will be thrown to the left. (See Fig. 3.) This will throw the frame 27 in the same direction and cause the right-hand gear 31 (see Fig. 2) to be engaged with the rack-bar, and during the upward movement of the rack-bar the right-hand gear 31 will be driven, thus transmitting its movement to the shaft 29 and finally to the gear 33 and pitman 35. As the rack-bar 15 reverses its movement and begins to descend the cord 20 performs a similar movement, and the bell-crank 22 is also reversed, so that its left-hand arm (see Fig. 3) is engaged with the pin 26 and the frame 27 thrown to the right—that is to say, to the position opposite that shown in Fig. 2. The downward movement of the rack-bar will now be transmitted to the left-hand gear 31 (see Fig. 2) and to the shaft 30, which will drive the gear 33 in the same direction that it was driven before. The result of these actions is therefore that the gear 33 is driven continuously in one direction, and its movement may be transmitted to any desired point by the pitman 35 and equivalent or coacting devices.

The modified form of my invention shown in Fig. 6 has a tower 6ª with a pole 8ª and wind-engaging body 10ª, all of which is the same as that described in the first form. Mounted to turn in the tower 6ª is a shaft 36, having a crank and pump-rod, as shown by dotted lines in the figure referred to. Fast to the shaft 36 is a spur-gear 37, which meshes alternately with rack-bars 38 and 39, fixed to a cross-head 40, mounted to move vertically in the tower on a bar 41, rigidly held by the tower. The cross-head 40 is also capable of slight transverse wabbling, for which purpose the opening in the cross-head made to receive the bar 41 is made wider than the bar, as shown in Fig. 6. The cross-head 40 is connected with the pole 8ª by means of a cord 16ª. Mounted to rock on the tower is a bell-crank lever 42, one arm of which is provided with a head 43, having two openings therein through which extend loosely the bars 38 and 39. The other arm of the bell-crank lever 42 extends out horizontally and is connected with two retractile springs 44 and 45. The spring 44 is in connection with the cross-head 40, and the spring 45 is in connection with a stationary portion of the tower. The movements before described of the pole 8ª will cause the cross-head 40, with the rack-bars 38 and 39, to be raised and lowered on the tower. As the cross-head moves upward the spring 44 is distended, which throws the bell-crank lever 41 so that the rack-bars 38 and 39 will be shifted to the left from the position shown in Fig. 6, thus disengaging the bar 38 from the gear 37 and throwing the bar 39 into mesh therewith. For this purpose the spring 44 is constructed of such strength that the spring 45 will be overcome as the cross-head 40 moves upward. As the cross-head 40 descends the spring 45 regains its normal tension, and the spring 44 now acts to throw the cross-head back to the position shown in Fig. 6, which results in an opposite movement of the rack-bars 38 and 39, causing the rack-bar 39 to move out of engagement with the gear-wheel 37 and the rack-bar 38 to mesh with the gear-wheel 37. The effect of these operations is that the gear-wheel 37, with the attached shaft 36, is caused continually to revolve in one direction. From the shaft 36 the motive power is taken by the crank and pump-rod above mentioned.

Having thus described my invention, I claim as new and desire to secure by Letters Patent—

1. In a wind-motor, the combination with a support, of a bar mounted to rock thereon, a pole pivoted to the bar on a pivot disposed at an angle to the pivot of the bar, a wind-engaging body carried at the upper portion of the pole, and gearing in connection with the lower portion of the pole to transmit the movement thereof.

2. In a wind-motor, the combination of a swinging pole, expansive springs mounted on the pole, collars sliding on the pole and pressed toward each other by the springs, collapsible ribs in connection with the collars, the ribs consisting each of intermediate rods and spreaders pivoted thereto and to the collars, and a flexible covering spread over the ribs and collapsible with the same.

3. A wind-motor, having a swinging pole adapted to be driven by currents of air, a wind-engaging body carried on the pole and capable of collapsing under the influence of excessive wind force, whereby to reduce the resistance offered by said body, and thus regulating the swaying motion of the swinging pole, and means for transmitting the movement of the pole.

4. In a wind-motor, the combination with a tower, of a gear-wheel mounted to turn thereon, two driven racks mounted to move longitudinally and transversely, a bell-crank lever mounted on the tower and connected with the racks, to move the same, a spring extending between the bell-crank lever and the tower, and a second spring having connection with the rack-bars and attached to the bell-crank lever.

5. In a wind-motor, the combination with a tower, of a pole mounted to swing thereon, a wind-engaging body carried by the pole, two racks rigidly joined to each other and having connection with the pole, the racks being reciprocated by the pole, a gear with which the racks are capable of alternately engaging, whereby to drive the gear, a bell-crank lever in connection with the racks to throw the racks laterally to engage and disengage the gear, and means for actuating the bell-crank lever.

6. In a wind-motor, the combination with the tower, of two racks mounted to slide therein and movable transversely, means driven by the wind and having connection with the racks to drive the same, a gear with which the racks are capable of alternately engaging, a bell-crank lever having connection with the racks to shift the same to engage and disengage the gear, and means for operating the bell-crank lever.

JUDSON STUART LANDON.

Witnesses:
    JAMES B. ALEXANDER,
    JAMES YELVERTON.